Aug. 23, 1932.    R. L. PEEK, JR., ET AL    1,873,470
CABLE ARMOR
Filed April 13, 1929

INVENTORS  R. L. PEEK JR.
C. L. HIPPENSTEEL
BY
J. W. Schmied
ATTORNEY

Patented Aug. 23, 1932                                          1,873,470

UNITED STATES PATENT OFFICE

ROBERT L. PEEK, JR., OF ELIZABETH, AND CLAUDE L. HIPPENSTEEL, OF BLOOMFIELD, NEW JERSEY, ASSIGNORS TO BELL TELEPHONE LABORATORIES, INCORPORATED, OF NEW YORK, N. Y., A CORPORATION OF NEW YORK

CABLE ARMOR

Application filed April 13, 1929. Serial No. 354,791.

This invention relates to protective armor for submarine cables, more particularly signaling cables in which the armor or sheathing is also required to function to a greater or lesser extent as a return conductor.

The properties required in submarine cable armor depend upon a large variety of conditions such as the type of cable, frequencies of waves to be transmitted, and depth of water. The specific gravity, tensile strength, breaking length of the armor wire in water (with a suitable factor of safety), conductivity, magnetic properties and the cost are all of importance.

For transmission of high frequency currents such as speech or carrier currents over a cable in which the armor wire functions as the return conductor, the conductivity is of considerable importance. For deep water cables the breaking length in water, with a suitable factor of safety, which is a function of the tensile strength and specific gravity, is also of importance. Under certain other conditions involving high frequency transmission, non-magnetic properties are preferred.

Certain age-hardened alloys of aluminum have a high tensile strength, a very favorable conductivity, and are non-magnetic but are not regarded as sufficiently resistant to corrosion in sea water.

A feature of this invention is a submarine cable sheathing having high tensile strength, a favorable value of conductivity and a high degree of resistance to corrosion under sea bottom conditions.

This object is accomplished in one embodiment of the invention by sheathing wires having a central core of age-hardened aluminum alloy with a coating of pure aluminum. Such a combination of metals may be made to have the necessary properties, including resistance to corrosion, because pure aluminum is highly resistant to salt water corrosion.

From a more generic aspect the invention relates to the use of armor wires having central cores of age-hardened alloys of aluminum with suitable properties covered with any non-corrosive metal of suitable other properties.

In the accompanying drawing.

Figure 1:
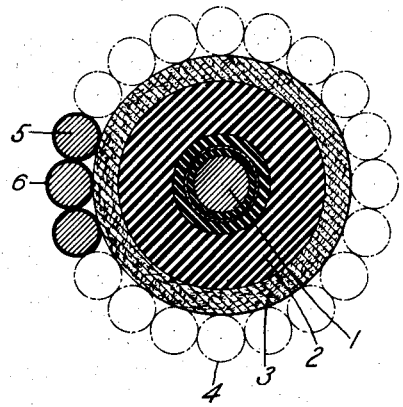
Fig. 1 is a cross section of a completely armored cable.

In Fig. 1 the conductor 1 is of the usual type and may be loaded or unloaded as circumstances may indicate. Upon the insulation 2 is placed a bedding of jute 3 which supports the armor wires 4.

Figure 2:
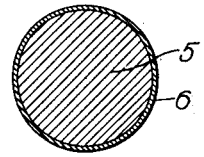
Fig. 2 is a cross section of a sheathing wire.
Figure 3:
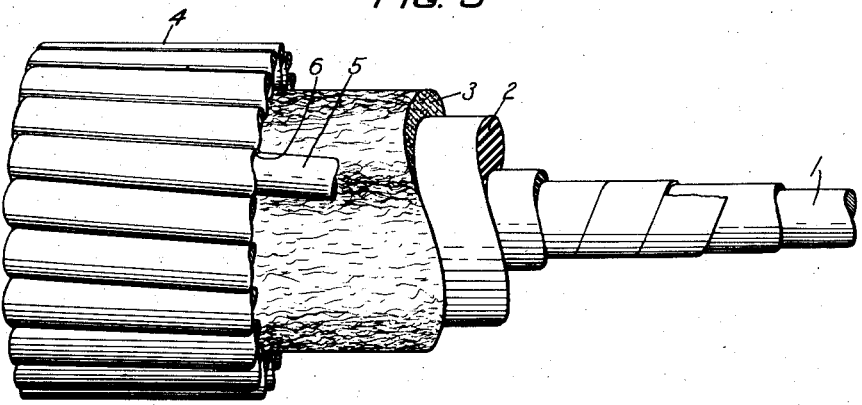
Fig. 3 is a side view of a cable showing one of the return circuit sheathing wires with an aluminum alloy core covered with pure aluminum.

Fig. 2 illustrates a single armor wire in cross section composed of a central core 5 and a coating layer 6.

The core material 5 may comprise, for example, an alloy of aluminum with .5% to 4%, preferably 1% silicon, .5% to 4% or preferably 1% manganese (herein styled alloy No. 1) or aluminum with 4% copper, .5% manganese and .5% magnesium (alloy No. 2) or aluminum with 4.5% copper, .5% manganese, .75% silicon, and .5% magnesium (alloy No. 3) coated with pure aluminum. The aluminum is non-corrosive in sea water.

The following table indicates the approximate properties these materials may be made to possess.

| Material | Sp. gr. | Approximate tensile strength in lbs. per sq. in. | Approximate breaking length in water | Approximate conductivity as compared to copper |
|---|---|---|---|---|
|  |  |  | Nauts | Per cent |
| Hard drawn aluminum | 2.7 | 25000 | 5.6 | 58 |
| Alloy No. 1 | 2.7 | 50000 | 11.2 | 55 |
| Alloys Nos. 2 and 3 | 2.7 | 70000 | 15.7 | 34 |

A typical design of cable for deep sea would be as follows:

(1) Conductor—1050 lbs. per naut, solid with ribbon surrounds. Suitable loading, giving diameter over loading of .248 in.

(2) Insulation—920 lbs. gutta percha per naut, outside diameter, .724 in.

(3) Suitable bedding of jute.

(4) Armor and sea return—18 wires aluminum clad wires of alloy No. 2 each .170 in. in diameter. Area of pure aluminum 15%, giving radial thickness of 6.7 mils.

(5) Suitable outer bedding giving a diameter overall of 1.34 inches.

The composite armor wires have a tensile strength of about 62500 lbs. per sq. in. of cross section and an available strength in six nauts of about 36000 lbs. per square inch, the available strength being defined as tensile strength less the weight in water of an assumed length, in this instance six nauts. The conductivity of the armor wire is about 35% that of copper. For alloy No. 1 the conductivity is higher but the strength considerably lower.

It will be seen that the invention provides a sheathing wire of lightness and good tensile strength which is non-corrosive in sea water and also has sufficient conductivity to function well as a return conductor in those types of structure demanding a return conductor of low resistivity. Furthermore, because the more conductive material is on the outer surface, the equivalent conductivity, owing to the skin effect, will be greater for currents of relatively high frequency than a uniform solid conductor of the same direct current conductivity.

What is claimed is:

1. A wire having a central core of an alloy of aluminum with at least one of the metals, copper, silicon, manganese and magnesium and having a surface coating of different metal non-corrosive in sea water.

2. A submarine cable surrounded by one or more spirally applied wires such as described in claim 1.

3. A submarine cable armored with one or more spirally applied members such as described in claim 1 in which the coating is aluminum.

4. A submarine cable armored with one or more wires composed of a base alloy of aluminum with 0.05 to 4% silicon, 0.05 to 4% manganese, with a coating of pure aluminum.

5. A submarine cable armored with one or more wires composed of a base alloy of aluminum with 3 to 5% copper, a small amount of manganese and a small amount of silicon with a coating of pure aluminum.

6. A submarine cable having a sheathing of light metal constituted by age-hardened alloys of aluminum with suitable alloying elements, characterized in this that the light sheathing wires are covered with a coating of aluminum in a purified form.

7. A submarine cable having a sheathing with a strand of age-hardened alloy consisting largely of aluminum and having a specific gravity less than 3, tensile strength over 40,000 pounds per square inch, and conductivity over 30% that of copper, covered with a different metallic substance of specific gravity less than 3 which is non-corrosive in sea water.

8. A submarine cable armored with one or more wires composed of a base alloy of aluminum with 3 to 5% copper, a small amount of manganese and magnesium, said wires being covered with a coating of pure aluminum.

9. A submarine cable having a sheathing of light metal constituted by age-hardened alloys of aluminum with suitable alloying elements selected from the group comprising copper, silicon, manganese and magnesium, characterized in this, that the light sheathing wires are covered with a coating of aluminum in a purified form.

In witness whereof, I hereunto subscribe my name this 12 day of April, 1929.

CLAUDE L. HIPPENSTEEL.

In witness whereof, I hereunto subscribe my name this 11th day of April, 1929.

ROBERT L. PEEK, Jr.